No. 653,165. Patented July 3, 1900.
J. BEDFORD & J. ASHTON.
METHOD OF MAKING COMPOUND CUTTER BARS.
(Application filed Oct. 27, 1899.)
(No Model.)
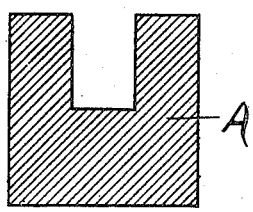
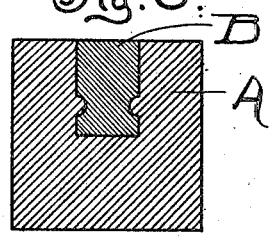
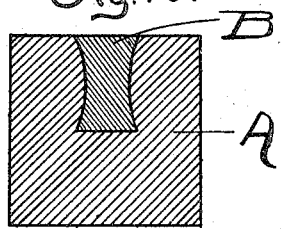
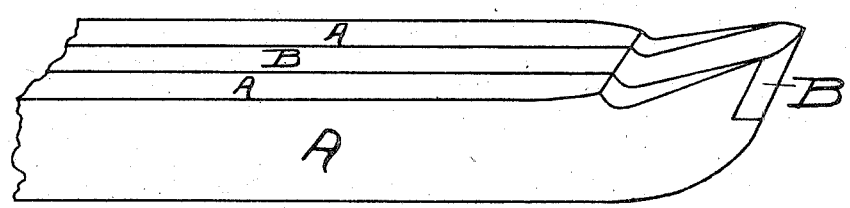
Witnesses
George M. Richards
Wm. H. Davis
Inventors
Joseph Bedford
Joseph Ashton
by W. H. Babcock Attorney

UNITED STATES PATENT OFFICE.

JOSEPH BEDFORD AND JOSEPH ASHTON, OF SHEFFIELD, ENGLAND, ASSIGNORS OF ONE-HALF TO WILLIAM H. BABCOCK, OF WASHINGTON, DISTRICT OF COLUMBIA.

METHOD OF MAKING COMPOUND CUTTER-BARS.

SPECIFICATION forming part of Letters Patent No. 653,165, dated July 3, 1900.

Original application filed November 8, 1897, Serial No. 657,792. Divided and this application filed October 27, 1899. Serial No. 734,904. (No model.)

*To all whom it may concern:*

Be it known that we, JOSEPH BEDFORD and JOSEPH ASHTON, citizens of Great Britain, residing at Sheffield, in the county of York, England, have invented certain new and useful Improvements in the Production of Compound Steel Bars for Making Cutting-Tools and the Like; and we do hereby declare the following to be a full, clear, and exact description of the invention, such as will enable others skilled in the art to which it appertains to make and use the same.

Our invention relates to the production of bars composed of a superior quality of cast-steel inclosed or partially surrounded by a greater body of cheaper steel or iron to give the requisite support and firmness to the higher-grade steel when put into use as a tool.

The principal object is to provide a tool of maximum grade or quality at a minimum cost of material and labor.

To carry our invention into effect, we make from the requisite quality of cast-steel a comparatively-small bar of any desired shape or section, which may be, say, square, flat, double-bevel, or trapeze form, with or without grooves, hollows, or cavities formed upon the sides. Likewise from a relatively-inferior quality of tough steel or iron we produce a larger bar of, say, a square or flat section and sink in one of its sides, corners, or edges a groove or grooves or recess of suitable size and shape to receive the bar of cast-steel, which last-mentioned bar we place within the said groove while the larger piece is still hot, or they may be put together with both bars cold, in which latter case the compound bar is to be put into a furnace. In either case the bar is to be finished without welding or soldering by pressure of rolls or by hammering in the manner ordinarily practiced for tool-bars. The compound bar so produced may be fashioned as an integral tool-bar for the class of work to be done practically as if from an ordinary bar of steel.

The accompanying drawings illustrate the method of procedure to obtain bars suitable for making tools.

Figure 1 is a cross-section of the rough bar ready for cast-steel. Fig. 2 is a section of a finished bar, the cast-steel having concaved sides. Fig. 3 is a similar section, the cast-steel having grooves in its sides, and Fig. 4 shows in perspective a tool formed from such a compound unwelded integral bar and ready for use.

On reference to Fig. 1 it will be apparent that the groove in the rough bar A would receive any section of cast-steel of corresponding dimensions. A piece B having been inserted, the compound bar is to be finished to the required size and shape—say as per Figs. 2 and 3—by pressure of rolling or hammering. The softer metal in any case will conform to the outline of the harder cast-steel and when cold will have a secure and firm grip upon and contact with the cast-steel. The tool Fig. 4 may be forged and finished exactly as if from solid steel.

We would have it understood that we do not confine ourselves to the exact shapes or proportions of materials herein illustrated, as our method is capable of great variation and adaptation to meet practical needs. It will be observed from the description and drawings that the harder bar of inserted metal is so shaped that upon pressure the softer inclosing bar will by conforming to the shape of the harder bar overlap parts of it, so as to form a more secure and solid article.

Having thus fully described our invention, what we claim as new, and desire to secure by Letters Patent, is—

The method or process of forming a compound integral bar of metal suitable for making cutting-tools without casting or welding, consisting in placing a harder bar of a quality incapable of being welded within a groove made in the softer bar and securing the two together by pressure, the harder bar having parts so shaped as to be overlapped by the softer bar when rolled or forged thereon, substantially as set forth.

In testimony whereof we affix our signatures in presence of two witnesses.

JOSEPH BEDFORD.
JOSEPH ASHTON.

Witnesses:
FRANK M. CLARK,
ISAAC BECK.